United States Patent [19]

Baversten et al.

[11] Patent Number: 5,291,531
[45] Date of Patent: Mar. 1, 1994

[54] AUXILIARY PLATFORM FOR BOILING WATER REACTORS

[75] Inventors: Bengt I. Baversten, Simsbury, Conn.; Rolf Petersson, Västerås, Sweden

[73] Assignee: Combustion Engineering, Inc., Windsor, Conn.

[21] Appl. No.: 998,585

[22] Filed: Dec. 30, 1992

[51] Int. Cl.5 .............................................. G21C 19/00
[52] U.S. Cl. ................................................... 376/268
[58] Field of Search ................ 376/260, 261, 264, 268

[56] References Cited

U.S. PATENT DOCUMENTS

| | | | |
|---|---|---|---|
| 3,168,444 | 2/1965 | Ingram | 376/271 |
| 4,056,435 | 11/1977 | Carlier et al. | 376/264 |

Primary Examiner—Daniel D. Wasil
Attorney, Agent, or Firm—Ronald P. Kananen; John H. Mulholland

[57] ABSTRACT

An auxiliary platform has a one-ton hoist which may be used in conjunction with a rigid pole handling system. The positioning of the one-ton hoist, as well as the positioning of a trolley on which the hoist is mounted and the positioning of the platform, is centrally controlled at a control panel. In one embodiment, a new set of tracks are provided on either side of a refueling pool. A pair of cavity platforms are installed over the edges of the reactor cavity to receive the new set of tracks and to thereby allow the auxiliary platform to travel over the reactor cavity. In another embodiment, the existing tracks are extended and a single new track is provided between the equipment pool and the reactor pressure vessel head pedestal and spent fuel cask washdown area. The auxiliary platform is made extendable so that it can travel over the width of the existing tracks and also over width defined by the new track and one of the existing tracks. The auxiliary platform can work independently of the refueling platform on a separate task or can aid the refueling platform in performing a single task. The auxiliary platform can both shorten the critical path time and reduce the exposure of radiation to workers.

14 Claims, 8 Drawing Sheets

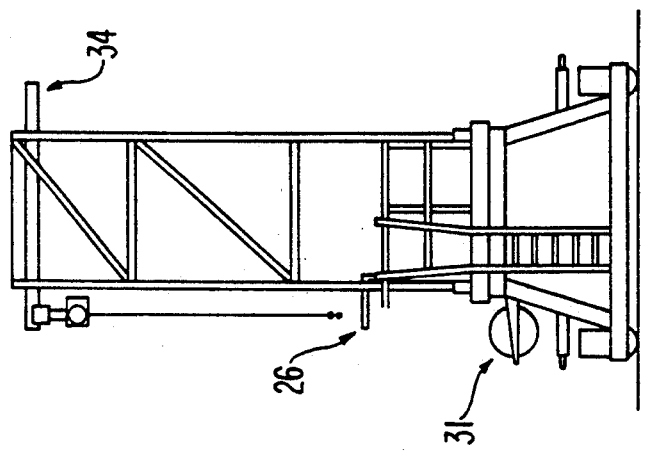
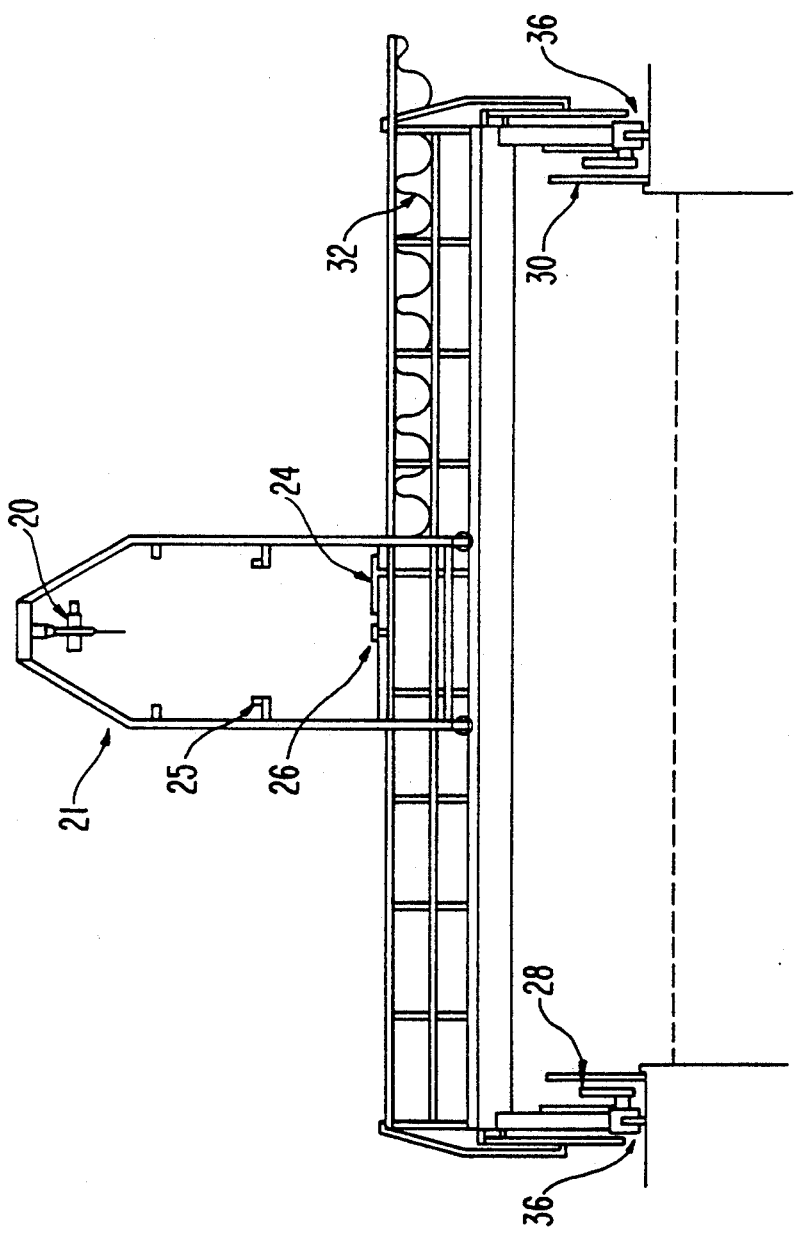

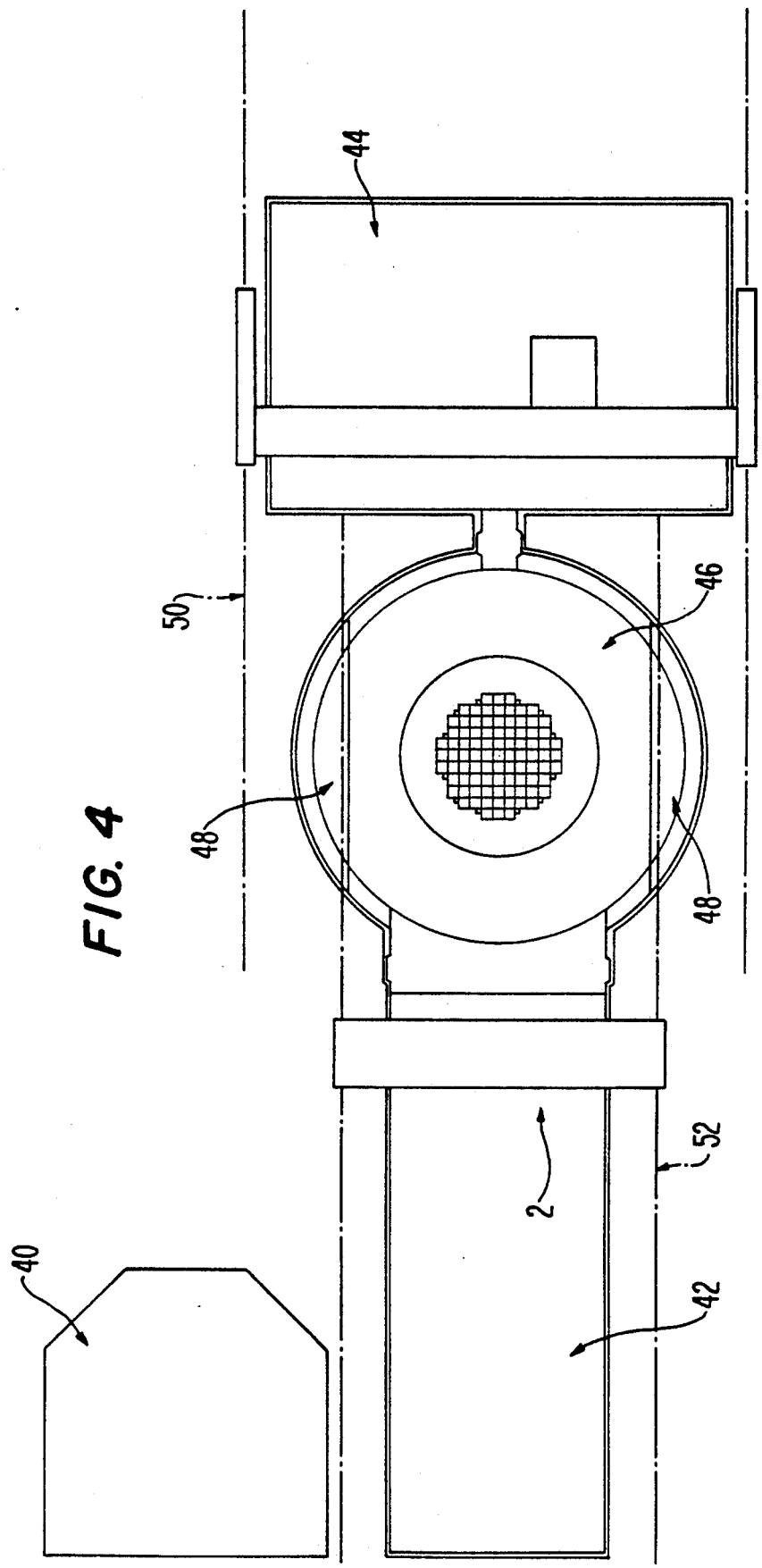

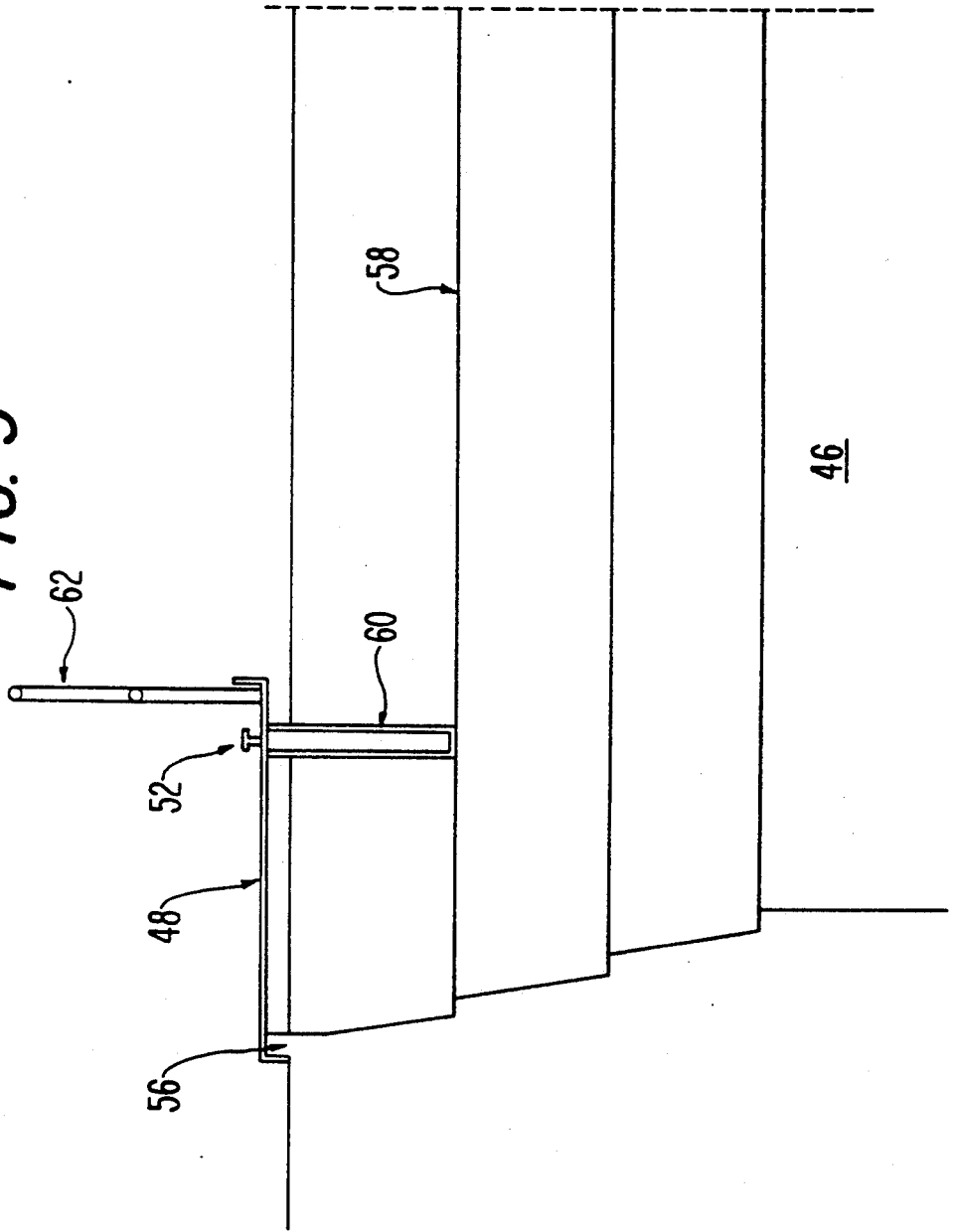

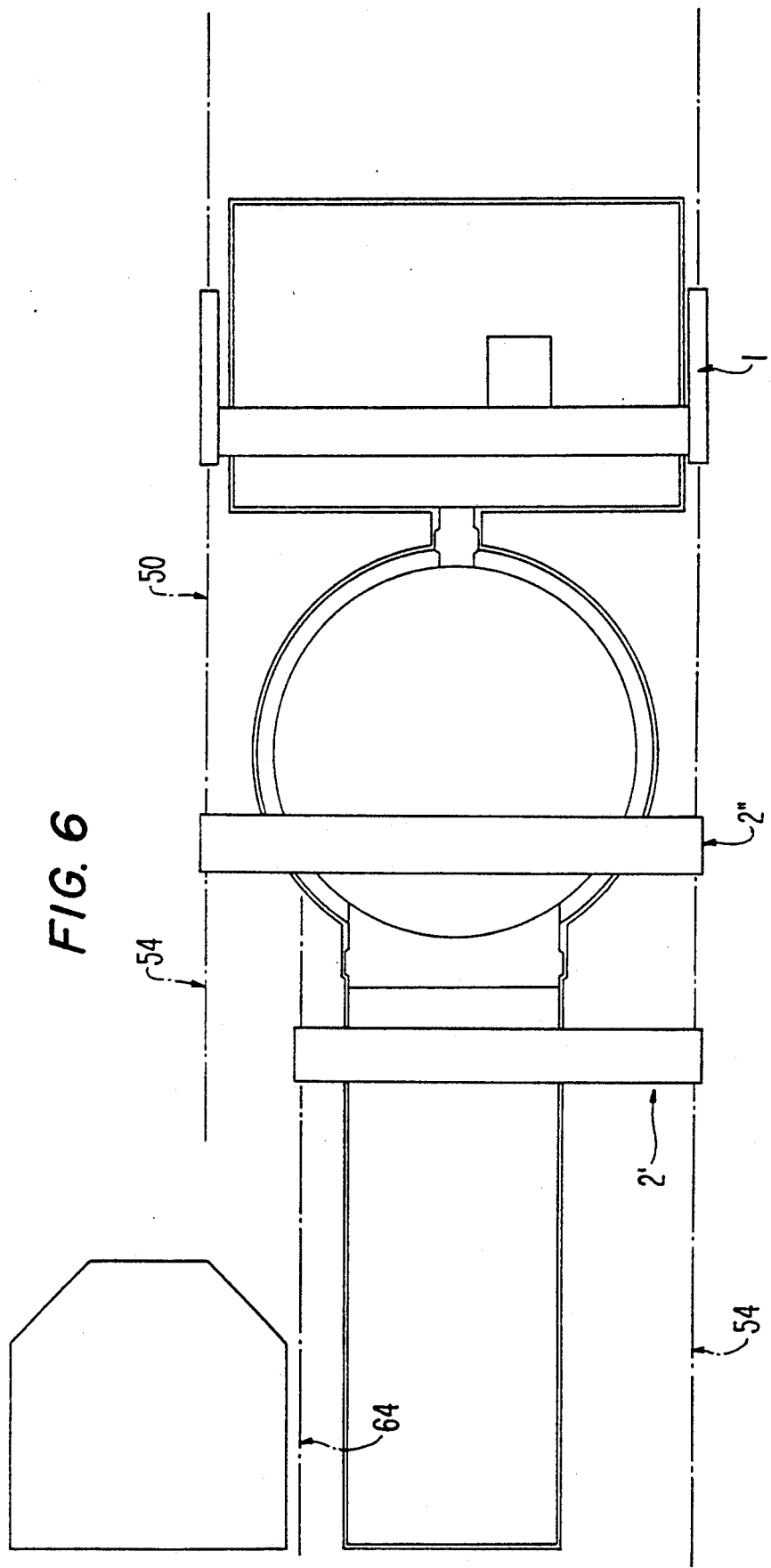

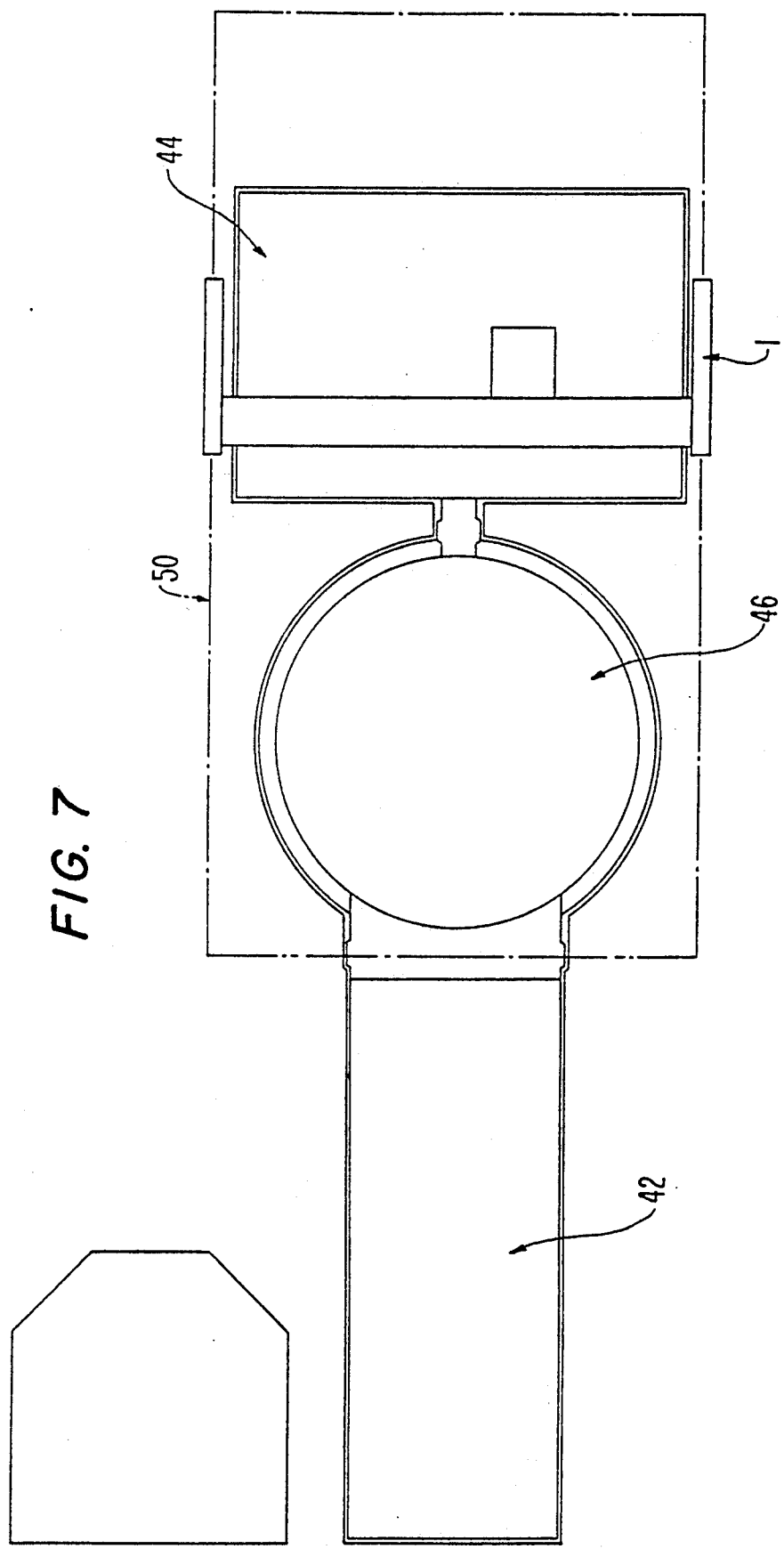

AUXILIARY PLATFORM FOR BOILING WATER REACTORS

BACKGROUND OF INVENTION

1. Field of the Invention

This invention generally relates to a platform system for use in boiling water reactor ("BWR") plants and, more particularly, to an auxiliary platform to be used in conjunction with a refueling platform in such plants.

2. Description of Prior Art

Typically, BWR plants have a refueling platform for traveling over a spent fuel pool and over a reactor cavity. The refueling platform may be used during a refueling operation and during other outage times to perform a variety of tasks. For instance, as shown in FIG. 1, the refueling platform travels over a pair of tracks 6. The refueling platform may be equipped with a rigid pole handling system for performing underwater operations. The rigid pole handling system comprises a hoist 10 attached to a carriage 12 that travels along a monorail. An operator may attach a tool 18 onto poles 8 from a pole storage rack 14 and lower the tool into the refueling pool. Once a task is completed with the tool 18, a different task may be performed with a different tool or at a different location.

To perform a complicated task or a number of tasks, however, the tools 18 must be changed a number of times and the refueling platform must be moved to a number of different locations. Thus, the performance of a single complicated task or the performance of numerous tasks is rather time consuming. Since workers are being exposed to radiation as the tasks are being performed, it is desirable to minimize the time needed to perform the tasks to thereby minimize the exposure time. Also, due to the limited space on the refueling floor, it is not possible to have the refueling platform travel across the entire refueling floor. Thus, access to all locations on the refueling floor is restricted.

SUMMARY OF THE INVENTION

It is an object of the present invention to provide a platform system which minimizes the time necessary to perform a task or a number of tasks.

It is also an object of the present invention to provide a platform system which minimizes the time workers are exposed to radiation.

It is another object of the present invention to provide an auxiliary platform which aids the operations of a refueling platform.

It is a further object of the present invention to provide an auxiliary platform which works independently of a refueling platform.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects, in accordance with the present invention, as embodied and broadly described herein, a platform system comprises a refueling platform and auxiliary platform for use in a boiling water reactor plant having a first area, a second area, and a third area. The refueling platform is capable of traveling over the second and third areas and at most only a portion of the first area. The auxiliary platform can travel over the first area and at least a portion of the second area. Both the refueling platform and the auxiliary platform have equipment for performing underwater operations and both platforms can operate independently of each other. The auxiliary platform can perform a task independently of and simultaneously with a task being performed with the refueling platform so that both outage time and radiation exposure to workers may be reduced.

BRIEF DESCRIPTION OF THE DRAWINGS

The accompanying drawings, which are incorporated in, and form a part of, the specification, illustrate embodiments of the present invention and, together with the description, serve to explain the principles of the invention. In the drawings:

FIG. 2 is a front view of an embodiment of an auxiliary platform;

FIG. 3 is a side view of the auxiliary platform of FIG. 2;

FIG. 4 is an embodiment of a track arrangement for the auxiliary platform of FIG. 2;

FIG. 5 is a cross section of a cavity platform;

FIG. 6 is a track arrangement for a second embodiment of an auxiliary platform;

FIG. 7 illustrates the area of the refueling floor covered by only the refueling platform;

DETAILED DESCRIPTION OF THE PREFERRED EMBODIMENT

Figure 1:
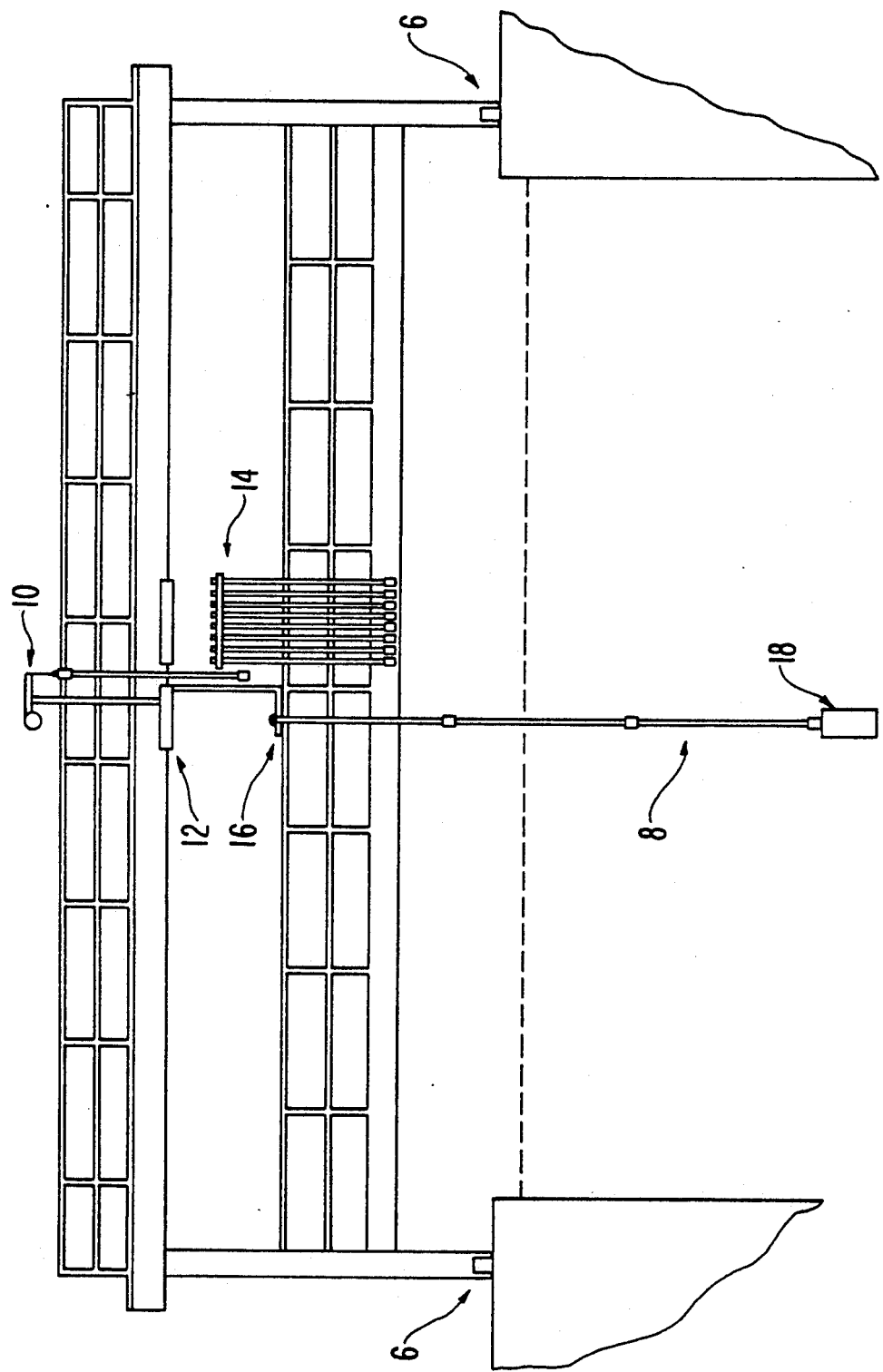
FIG. 1 is a front view of a prior art refueling platform.

Reference will now be made in detail to the preferred embodiments of the invention, examples of which are illustrated in the accompanying drawings.

With reference to FIGS. 2 and 3, an embodiment of an auxiliary platform comprises a one-ton hoist 20 which travels perpendicular to the platform along a monorail 34. Among other functions, the one-ton hoist 20 may be used with a rigid pole handling system. An operator at a pole assembly station 26 attaches poles stored at a pole storage rack 24 onto the hoist 20. A tool is attached to the poles and is then lowered into a pool (the surface of which is shown by a dashed line) with the hoist 20 in order to perform a desired task.

A cable festoon 32 is connected to a control station on a trolley 21 for various controls. For instance, the control station preferably comprises the pole assembly station 26 and may be used to position the hoist 20 along the length of the monorail 34, to lower and raise the hoist 20, to position the trolley 21 along the length of the platform, and to move the platform over tracks 36 to any location in the pool. A pair of drive units 28 are located near a pool railing 30 and are controlled with the control station to drive the auxiliary platform along the tracks 36. Preferably, the drive units 28, as well as the units which drive the hoist and trolley, use multi-speed motors for allowing an operator to easily position the hoist, trolley, and platform. The operator therefore has direct and precise control over all movements and can easily position a tool to access any underwater location traversed by the auxiliary platform.

The auxiliary platform may also have a cable reel 31. The cable reel 31 is used with a cable system which is lowered and raised independently of the hoist 20. The cable system may be used, for instance, for underwater lighting or for providing underwater TV cameras. Alternatively, the cable reel 31 may be used to lower and raise a hose system which may be used, for instance, with compressed air or water to operate underwater power tools.

With reference to FIG. 4, the refueling platform 1 can travel across tracks 50 to be positioned over the spent fuel pool 44 or over the reactor cavity 46. The refueling platform 1, however, is too wide to travel across the entire length of an equipment pool 42 due to the location of a reactor pressure vessel head pedestal and a spent fuel cask washdown area 40. Thus, the auxiliary platform 2 cannot use the existing tracks 50 to travel all the way across the equipment pool 42 and therefore cannot access the entire length of the refueling floor.

As shown in one embodiment in FIG. 4, a new set of tracks 52 are provided for the auxiliary platform which are narrower than tracks 50. The new set of tracks 52 run across a pair of cavity platforms 48, which are placed over the edges of the reactor cavity 46, so that the auxiliary platform 2 can travel across the reactor cavity 46. The cavity platforms 48 are not usually in place over the reactor cavity 46 but may be installed as soon as the reactor cavity shield plugs are removed from the reactor cavity 46. With the two sets of tracks, the auxiliary platform 2 can travel across the entire length of the equipment pool 42 and the reactor cavity 46 and the refueling platform 1 can travel across the spent fuel pool 44 and the reactor cavity 46. Thus, the auxiliary platform 2 and the refueling platform 1 together provide full access to the refueling floor.

With reference to FIG. 5, the cavity platform 48 is placed over the edge of the reactor cavity 46 so that one edge of the cavity platform 48 engages a curb 56 of the reactor cavity 46. A platform and track support 60 is located below the new set of tracks 52 and rests upon a reactor cavity shield block seat 58. The reactor platform 48 also comprises a railing 62. By having the inner edges of the cavity platform 48 not extend further into the reactor cavity 46 than a drywall flange, the cavity platforms 48 do not restrict the mobility of the refueling platform 1.

In a second embodiment of the track arrangement, as shown in FIG. 6, rather than installing a new set of tracks 52, the existing tracks 50 are extended to have track sections 54. Additionally, a new track 64, which travels from one end of the equipment pool 42 to the reactor cavity 46, is added between the equipment pool 42 and the head pedestal and spent fuel cask washdown area 40. The auxiliary platform 2, is made extendable so that as it travels from the one end of the equipment pool 42 to the reactor cavity 46, the platform 2' first travels across the lower extended track 54 and across the new track 64. At a point after the platform 2' passes the head pedestal and spent fuel cask washdown area 40, the platform 2' is extended to form an extended platform 2" for traveling across the existing tracks 50. Thus, at this point, the extended auxiliary platform 2" has the same width as the refueling platform 1. By having an extendable auxiliary platform 2' or 2", the auxiliary platform 2' or 2" can travel across the entire length of the refueling floor.

The auxiliary platform 2 may be extended to the widths of platforms 2' or 2" in various manners. Preferably, for example, the auxiliary platform 2 is constructed so that one side of the platform 2 slides into the other side of the platform 2 in a telescopic arrangement or both ends of the platform 2 slide into a central section of the platform 2 in a telescopic arrangement. A set of bolts, or other suitable fastening devices, connects the two ends of the platform 2 at one of a plurality of positions to thereby fix the width of the platform 2. To adjust the width of the platform 2, the bolts are removed, the platform 2 is adjusted to a desired width, and then the bolts are reattached.

Alternatively, rather than constructing the platform 2 in a telescopic arrangement, an insert may be added to extend the platform 2 to the desired width. By having a plurality of inserts with varying widths, the width of the auxiliary platform 2 may be varied to a desired width by selecting the insert with the proper width. Also, more than one insert may be added to the auxiliary platform 2 in order adjust the width of the platform 2 to the desired width.

The auxiliary platform 2, 2', or 2" is lighter in weight than the refueling platform 1 and does not have a refueling mast tower. These two features of the auxiliary platform 2, 2', or 2" allow greater maneuverability than with the refueling platform 1. The auxiliary platform 2, 2', or 2" also allows independent underwater work to be performed simultaneously with work performed on the refueling platform 1, which can both reduce the critical path time and the exposure to radiation. Moreover, besides allowing the simultaneous performance of two tasks, the auxiliary platform 2, 2' or 2" may be used in conjunction with the refueling platform 1 to perform a single task, such as a single complicated task. Therefore, the use of the auxiliary platform 2, 2', or 2" with the refueling platform 1 allows tasks to be performed more quickly and effectively and with better access to the work area.

FIG. 7 illustrates the area of the refueling floor covered by only the refueling platform 1 as it travels over the existing set of tracks 50. This area covers the spent fuel pool 44, the reactor cavity 46, and at most only a portion of the equipment pool 42. The area covered by the refueling platform 1, however, does not include all of the equipment pool 42.

Figure 8:
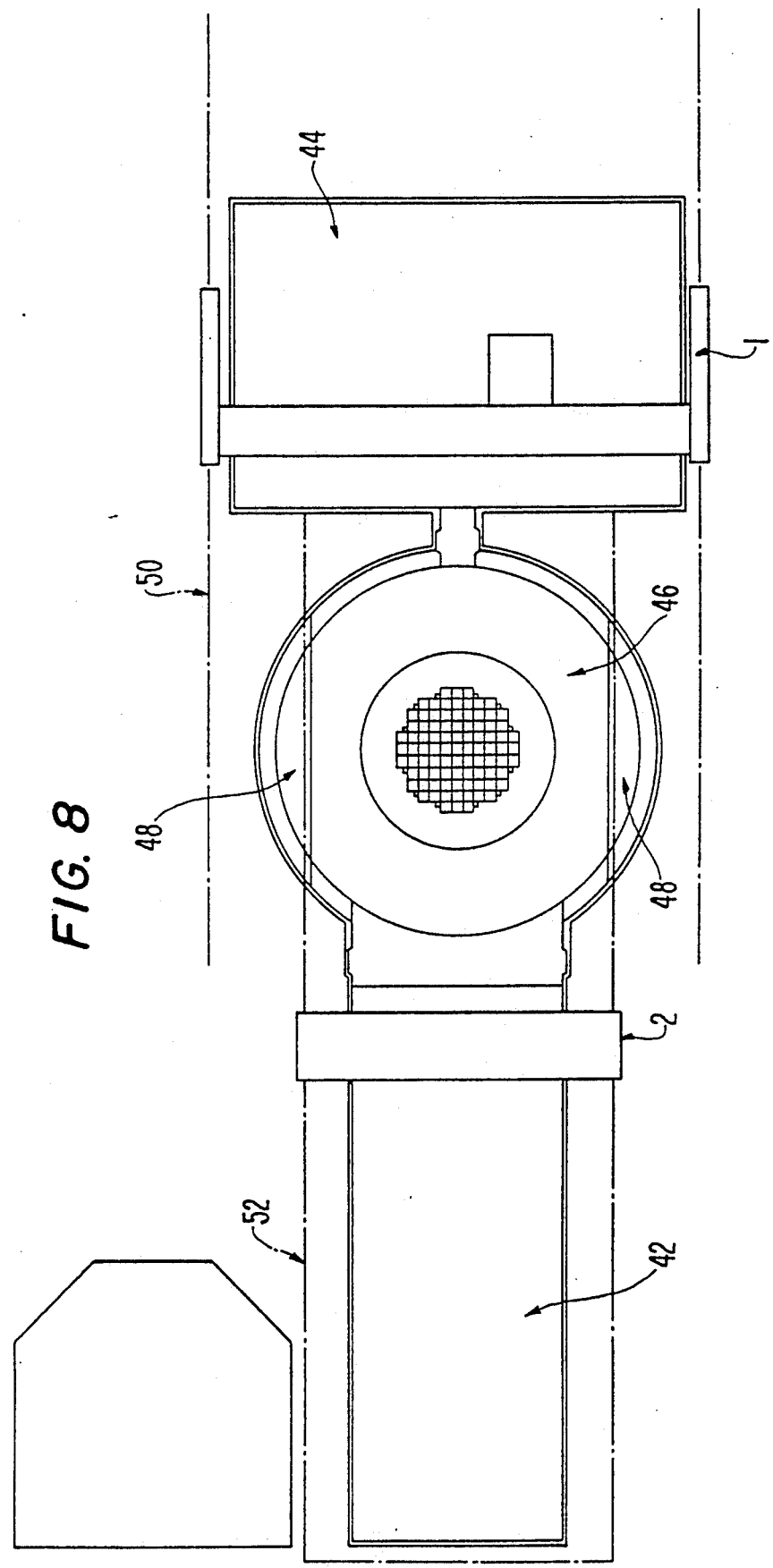
FIG. 8 illustrates the area of the refueling floor covered by only the auxiliary platform of FIG. 4.
Figure 9:
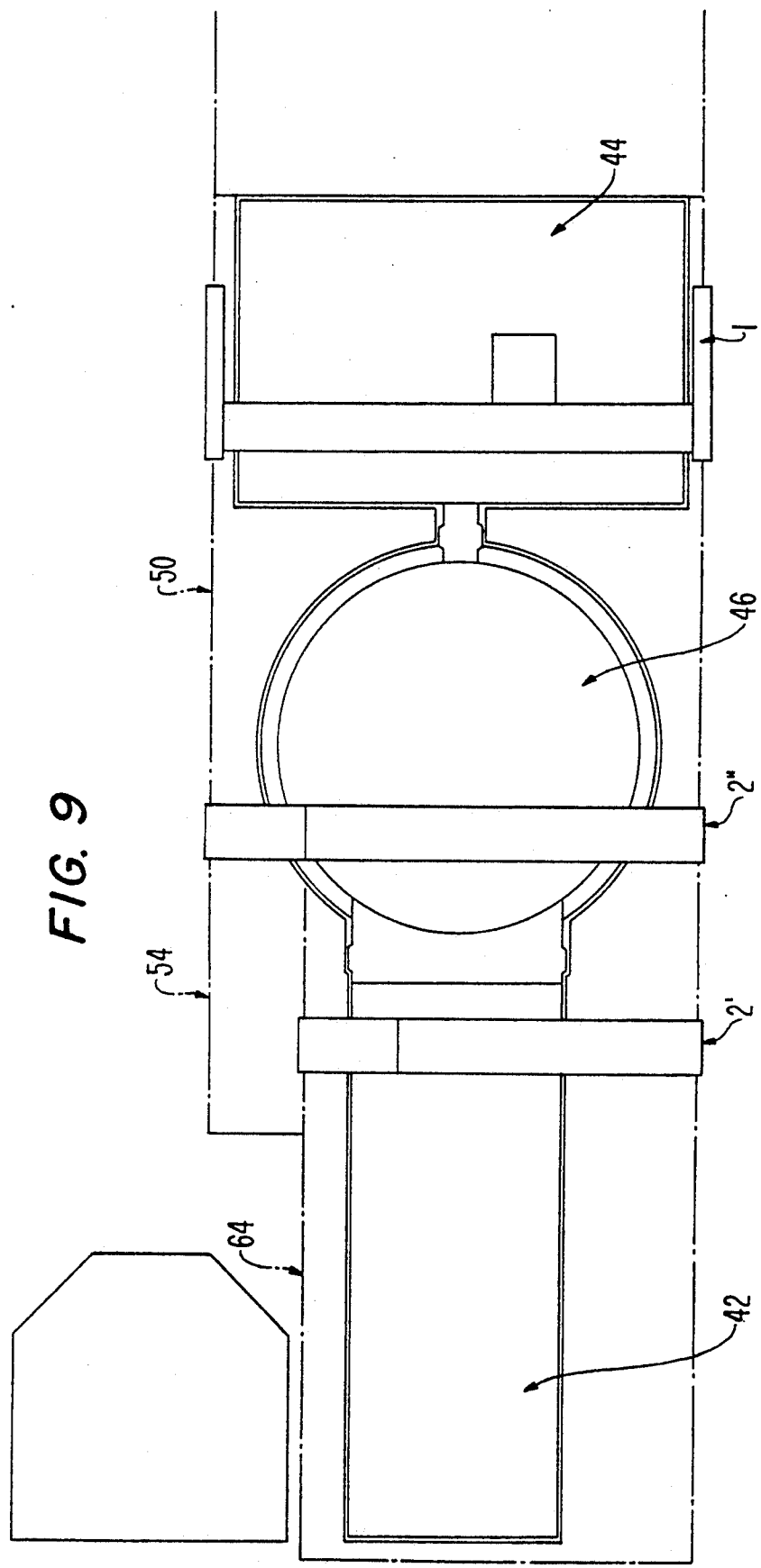
FIG. 9 illustrates the area of the refueling floor covered by only the auxiliary platform of FIG. 6.

FIG. 8 shows the area of the refueling floor covered by the auxiliary platform 2 of FIG. 4, which travels over the new set of tracks 52. This area encompasses the entire length of the equipment pool 42 as well as most of the reactor cavity 46. The area of the refueling floor covered by the extendable platform 2' or 2" of FIG. 6 is shown in FIG. 9. As shown in the figure, the extendable platform 2' or 2" can cover the entire area covered by the refueling platform and also an area about the equipment pool 42 larger than that covered by the auxiliary platform 2 of FIG. 4. Regardless of whether the auxiliary platform 2 of FIG. 4 is used or the extendable auxiliary platform 2' or 2" of FIG. 6 is used, the total area of the refueling platform covered by both the auxiliary platform and the refueling platform is much greater than the area covered by only the refueling platform 1.

The foregoing description of the preferred embodiments of the invention has been presented for purposes of illustration and description. It is not intended to be exhaustive or to limit the invention to the precise forms disclosed. Many modifications and variations are possible in light of the above teaching. The embodiments were chosen and described in order to best explain the principles of the invention and their practical application to thereby enable others skilled in the art to best utilize the invention and various embodiments and with various modifications as are suited to the particular use contemplated. It is intended that the scope of the invention only be limited by the claims appended hereto.

We claim:

1. A platform system for use in a boiling water reactor plant having a first area, a second area, and a third area, comprising:
   a refueling platform for traveling over said second area, said third area, and at most only a portion of said first area, said refueling platform comprising:
      a first platform for traversing over said second area, said third area, and said portion of said first area;
      first means connected to said first platform for performing underwater operations within said second area, said third area, and said portion of said first area; and
      first means for moving said first platform and said performing means over different locations within said second area, said third area, and said portion of said first area; and
   an auxiliary platform for traveling over said first area and at least a portion of said second area, said auxiliary platform comprising:
      a second platform for traversing said first area and said portion of said second area;
      second means connected to said second platform for performing underwater operations within said first area and said portion of said second area; and
      second means for moving said second platform and said second performing means over different locations within said first area and said portion of said second area;
      wherein said auxiliary platform operates independently of said refueling platform.

2. The platform system as set forth in claim 1, wherein said first, second, and third areas comprise an equipment pool, a reactor cavity, and a spent fuel pool, respectively.

3. The platform system as set forth in claim 1, wherein said auxiliary platform travels over all of said second area and also over said third area.

4. The platform system as set forth in claim 1, wherein said second means for performing underwater operations comprises a hoist and a rigid pole handling system.

5. A platform system for use in a boiling water reactor plant having a first area, a second area, and a third area, comprising:
   a refueling platform for traveling over said second area, said third area, and at most only a portion of said first area, said refueling platform comprising:
      a first platform for traversing over said second area, said third area, and said portion of said first area;
      first means connected to said first platform for performing underwater operations within said second area, said third area, and said portion of said first area; and
      first means for moving said first platform and said performing means over different locations within said second area, said third area, and said portion of said first area; and
   an auxiliary platform for traveling over said first area and at least a portion of said second area, said auxiliary platform comprising:
      a second platform for traversing said first area and said portion of said second area;
      second means connected to said second platform for performing underwater operations within said first area and said portion of said second area; and
      second means for moving said second platform and said second performing means over different locations within said first area and said portion of said second area;
      wherein said auxiliary platform operates independently of said refueling platform; and
      wherein said second platform is extendable to different widths.

6. The platform system as set forth in claim 5, wherein said second platform has at least one telescoping end which allows said second platform to have said different widths.

7. The platform system as set forth in claim 5, wherein said second platform receives an insert to extend the width of said second platform to one of said different widths.

8. The platform system as set forth in claim 1, wherein said second moving means comprises a set of tracks upon which said second platform travels.

9. The platform system as set forth in claim 8, wherein said set of tracks is separate from an existing set of tracks used by said refueling platform.

10. The platform system as set forth in claim 9, wherein said set of tracks travels over cavity platforms located over edges of a reactor cavity.

11. The platform system as set forth in claim 8, wherein said set of tracks comprises extended portions of an existing set of tracks, which are used by said first platform, and a new track located on one side of said first area.

12. A platform system for use in a boiling water reactor plant having a first area, a second area, and a third area, comprising:
   a refueling platform for traveling over said second area, said third area, and at most only a portion of said first area, said refueling platform comprising:
      a first platform for traversing over said second area, said third area, and said portion of said first area;
      first means connected to said first platform for performing underwater operations within said second area, said third area, and said portion of said first area; and
      first means for moving said first platform and said performing means over different locations within said second area, said third area, and said portion of said first area; and
   an auxiliary platform for traveling over said first area and at least a portion of said second area, said auxiliary platform comprising:
      a second platform for traversing said first area and said portion of said second area;
      second means connected to said second platform for performing underwater operations within said first area and said portion of said second area; and
      second means for moving said second platform and said second performing means over different locations within said first area and said portion of said second area;
      wherein said auxiliary platform operates independently of said refueling platform; and wherein said second platform has its width varied from a first span to a second span and said auxiliary platform travels from said first area to said second area.

13. The platform system as set forth in claim 12, wherein said auxiliary platform also travels over said third zone at said second span.

14. The platform system as set forth in claim 1, wherein said second platform is at a fixed width as said auxiliary platform travels from said first zone to said second zone.

* * * * *